(12) United States Patent
Mitchell et al.

(10) Patent No.: US 9,135,631 B2
(45) Date of Patent: Sep. 15, 2015

(54) COMPUTER-VISION CONTENT DETECTION FOR SPONSORED STORIES

(75) Inventors: Justin Mitchell, Palo Alto, CA (US); Samuel Odio, Portola Valley, CA (US); David Harry Garcia, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 31 days.

(21) Appl. No.: 13/212,356

(22) Filed: Aug. 18, 2011

(65) Prior Publication Data

US 2013/0044959 A1  Feb. 21, 2013

(51) Int. Cl.
  *G06K 9/00* (2006.01)
  *G06Q 30/02* (2012.01)
  *G06Q 50/00* (2012.01)

(52) U.S. Cl.
  CPC ............... *G06Q 30/02* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 8,423,109 B2 * | 4/2013 | Baker, Jr. | 600/336 |
| 8,554,627 B2 * | 10/2013 | Svendsen et al. | 705/14.67 |
| 8,660,355 B2 | 2/2014 | Rodriguez | |
| 2009/0048921 A1 * | 2/2009 | Tokuda et al. | 705/14 |
| 2009/0119165 A1 * | 5/2009 | Cotgreave | 705/14 |
| 2010/0046842 A1 | 2/2010 | Conwell | |
| 2010/0076851 A1 * | 3/2010 | Jewell, Jr. | 705/14.67 |
| 2010/0088182 A1 * | 4/2010 | Ryder et al. | 705/14.66 |
| 2011/0052012 A1 * | 3/2011 | Bambha et al. | 382/118 |
| 2011/0244919 A1 | 10/2011 | Aller | |
| 2011/0283236 A1 * | 11/2011 | Beaumier et al. | 715/835 |
| 2012/0005224 A1 | 1/2012 | Ahrens | |
| 2012/0041825 A1 | 2/2012 | Kasargod | |
| 2012/0238254 A1 * | 9/2012 | Yankovich et al. | 455/414.2 |
| 2012/0239506 A1 * | 9/2012 | Saunders et al. | 705/14.67 |

OTHER PUBLICATIONS

Mark R. Robertson, "The First Contextual Ad Platform to Leverage Image and Video Recognition Technologies Launched Today", archived by web.archive.org on Jul. 28, 2009, from website www.reelseo.com, linked from "home" to "video advertising", 8 pages total.*

Business Insider, "How to Stop Facebook From Using Your Name and Photo in Ads", published at businessinsider.com, on Mar. 21, 2011, 5 pages total.*

Office Action for U.S. Appl. No. 13/212,344, Sep. 11, 2014.

* cited by examiner

*Primary Examiner* — Brian P Werner
(74) *Attorney, Agent, or Firm* — Baker Botts L.L.P.

(57) ABSTRACT

Methods, apparatuses and systems directed to sponsored story generation from an photo upload in an organic activity stream in a social networking site. A social networking system may apply computer image algorithms to detect image objects in user-uploaded images and videos, and promote them as sponsored stories.

20 Claims, 9 Drawing Sheets

COMPUTER-VISION CONTENT DETECTION FOR SPONSORED STORIES

TECHNICAL FIELD

The present disclosure relates generally to social networking systems and other systems in which users can form connections with other users, and in particular, applying computer vision algorithms to user-uploaded multimedia objects to detect specific objects within the multimedia object, and promoting the uploaded multimedia object from a users' news feed to a sponsored stories area.

This disclosure hereby incorporates by reference commonly-owned U.S. utility patent application, U.S. patent application Ser. No. 13/020,745 entitled, "Sponsored Stories Unit Creation from Organic Activity Stream," previously filed on 3 Feb. 2011.

This disclosure hereby incorporates by reference commonly-owned U.S. utility patent application, U.S. patent application Ser. No. 13/044,506 entitled, "Endorsement Subscriptions for Sponsored Stories" previously filed on 9 Mar. 2011.

BACKGROUND

Social networks, or social utilities that track and enable connections between users (including people, businesses, and other entities), have become prevalent in recent years. In particular, social networking systems allow users to communicate information more efficiently. For example, a user may post contact information, background information, job information, hobbies, or other user-specific data to a location associated with the user on a social networking system. Other users can then review the posted data by browsing user profiles or searching for profiles including specific data. Social networking systems also allow users to associate themselves with other users, thus creating a web of connections among the users of social networking system. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target sponsored stories that are of interest to the user. Using information collected from and about users results in a system that is more efficient and beneficial for both the user and the system.

Users interacting with the social network may post stories or status updates to a live activity stream, such as a "news feed." A news feed is a data format typically used for providing users with frequently updated content. A social networking system may provide various news feeds to its users, where each news feed includes content relating to a specific subject matter or topic, or other users. Various pieces of content may be aggregated into a single news feed. In some implementations, a social networking system may provide a news feed that includes selected entries corresponding to activities of a user's first-degree contacts or pages or topics that a user has indicated an interest. Individual users of the social networking system may subscribe to specific news feeds of their interest. A group of related actions may be presented together to a user of the social networking system in the same news feed. For example, a news feed concerning the event organized through the social networking system may include information about the event such as its time, location, and attendees, and photos taken at the event, which have been uploaded to the social networking system.

Sponsored or promoted stories generated from actual stories in users' newsfeeds are more likely to be viewed by users, because they generally involve interactions or suggestions by their connected friends, or fan pages that they are connected or subscribed to. However, sponsored stories require explicit, on-network interaction with a sponsor node, such as a check-in to a physical location, "liking" their hub page, commenting on their hub page, reviewing their product, and the like. A significant portion of off-network activity lacking explicit user interaction, is captured in uploaded photos.

Figure 1:
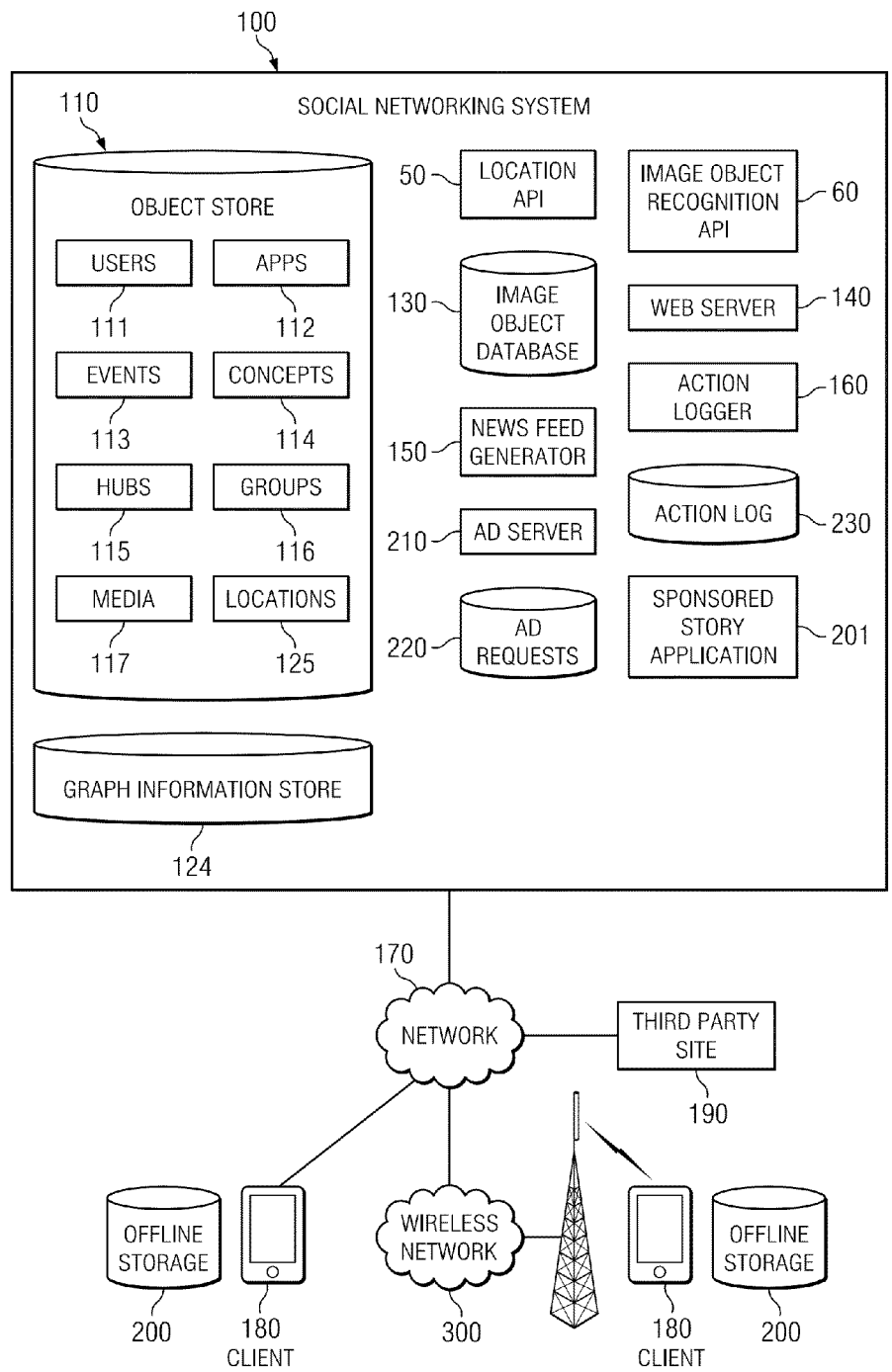
FIG. 1 illustrates an example computer network environment of an example social network.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a social networking environment including a social networking system and related systems that integrate individual stories, status updates, and user interactions with an advertising system. A social networking system offers its users the ability to communicate and interact with other users of the social networking system. Users join the social networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to.

In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

Implementations of the present disclosure extend these concepts by allowing sponsors to export by promoting specific newsfeed stories to sponsored story space on users' social networking pages, thereby increasing the display duration and viewing frequency of these stories. In particular, implementations of the present disclosure allow sponsors or advertisers to capture off-network behavior or interactions with their brand by applying computer-vision algorithms to user-uploaded multimedia objects, such as photographs and videos.

In particular embodiments, the social networking system maintains a photographic object database of various objects. In particular embodiments, the images in the photographic object database are generated by the social network itself. In particular embodiments, the images are submitted by administrators of nodes associated with businesses, such as business owners. A particular business owner may submit a photo image of his or her storefront, for example. As an example, a particular sponsor may submit multiple photos of its logo or product. In particular embodiments, the photographic location database is provided by a third-party such as Google images. In particular embodiments, the images may be uploaded and tagged by users of the social network. This disclosure contemplates any method of generating or obtaining the photographic object database.

In particular embodiments, photographs uploaded to the social networking system are subject to an image object recognition algorithm. The image object recognition algorithm compares the uploaded image to images stored in the photographic object database and searches for similar objects. Methods for object searching are well-known in the art, and may include frequency-domain image processing, filtering, wavelet analysis, feature extraction, learning-algorithms such as neural networks, texture recognition, and the like. This disclosure contemplates any type of computer vision algorithms for finding matching objects.

In one example, a sponsor may wish to boost any newsfeed story involving a photo upload where a user is interacting with the sponsor's brand. For example, if a user is photographed at a Starbucks, or holding a Starbucks cup, the sponsor may wish to boost the photograph itself, along with some promotional material, to the sponsored stories space of the user's friends or first degree connections. Such a sponsored story is far more interesting to the user's friends compared to a static advertisement, because it contains a real-life photograph of the user interacting with the brand. Additionally, the user does not have to perform any on-network actions such as checking-in to the Starbucks, "liking" Starbucks, or even making a comment about Starbucks. Thus, the user's off-network behavior or endorsement of Starbucks is captured and leveraged for a more beneficial experience for users and sponsors alike. Other embodiments are readily envisioned by the disclosure and are described in detail below.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

FIG. 1 is a high-level block diagram of a social networking system including an image-based object determination system according to one embodiment. FIG. 1 illustrates a social networking system 100, client devices 180, wireless cellular network 300, and third-party website 190. It is understood that wireless cellular network 300 represents multiple wireless cellular networks provided by a plurality of carriers. FIG. 1 also includes offline storage 200 that is local to client device 180. Client device 180 is depicted as a mobile phone, but client device 180 may comprise any type of computing device, including mobile phone, laptop, netbook tablet, cable box, television, etc. Client device 180 is any device with both a data connection to network 170 and a camera. Client device 180 need not have a direct connection to network 170 or wireless data network 300. For example, client device 180 may be a digital camera with a Bluetooth connection to a modem. Client device 180 has one or more memories capable of storing captured multimedia objects such as photos, videos, and audio files, depicted in FIG. 1 as offline storage 200.

Social networking system 100 comprises a computing system that allows members to communicate or otherwise interact with each other and access content as described herein. Social networking system 100 stores member profiles that describe the members of a social network, including biographic, demographic, and other types of descriptive information, such as work experience, educational history, hobbies or preferences, location, and the like. Website 100 further stores data describing one or more relationships between different members. The relationship information may indicate members who have similar or common work experience, group memberships, hobbies, or educational history.

A user of the client device 180 interacts with the social networking system 100 via an application, such as a web browser or a native application, to perform operations such as browsing content, posting and sending messages, retrieving and sorting messages received from other users, uploading multimedia objects, and the like. Client device 180 may also use an application or browser to pull and view profile information for various user nodes and hubs in social networking system 100.

Social networking system 100 comprises an object store 110, and a graph information store 120. The object store 110 stores information on objects, such as users, represented in or by the social networking environment 100. The graph information store 120 stores information on the relationships of the objects in the object store 110.

Object store 110 includes various storage areas. User store 111 includes profile pages for specific user accounts or members of social networking system 100. Hubs store 115 includes profile or hub pages for concept nodes such as businesses, locations, and celebrities. Apps store 112 includes third-party applications that users may install and run on their profile page. Media store 116 includes uploaded user media such as photos, videos, audio files, and other types of multimedia objects.

Image object database 130 stores information regarding physical real-world objects or logos, that may be associated with concept nodes, such as brand, product, or company. In one implementation, each object can be maintained as a hub node in a social graph or other data structure maintained by the social networking system. Social networking system 100 may allow users to access information regarding each object using a client application (e.g., a browser) hosted by a wired or wireless station, such as a laptop, desktop or mobile device. For example, social networking system may serve web pages (or other structured documents) to users that request information about an object. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users.

Location application program interface (API) 50 and image object recognition API 60 interacts with client device 180 to receive photos and other multimedia objects. In particular embodiments, client device 180 may upload photos substantially in real-time and without user action. In particular embodiments, client device 180 only uploads the photo in response to specific user actions. In particular embodiments, client device 180 uploads the photo or multimedia device through wireless network 300. In particular embodiments, client device 180 has a wired or wireless connection, such as a cellular connection or WiFi connection, and uploads the photo or multimedia object directly through network 170. This disclosure contemplates any manner of connectivity from client device 180 to social networking system 100.

Image object recognition API 60 accesses photographic object database 130. Photographic object database 130 contains a collection of images of logos, products, brands, and the like. In particular embodiments, photographic object database 130 includes, for each photo, an association with a particular concept node stored in concept store 114. In particular embodiments, searchable text extracted through OCR is stored in association with photo images containing signage or other sources of text. For example, photographic object database 130 may store the text "Coca-Cola" in a searchable format in association with a photo of a Coca-Cola product. In particular embodiments, photographic object database 130 stores a link to the node associated with the object, and pulls text or other related data directly from the node as necessary.

Photographic object database 130 may be updated to keep the photographs current. In particular embodiments, photos and videos received from other users may be utilized to update photographic object database 130. In particular embodiments, location image object recognition API 60 may pull images from third-party sites 190 such as Yelp! or Google Images to update photographic object database 130.

Additionally, social networking system 100 includes a web server 140, an action logger 160, an action log 230, a newsfeed generator 150, an ad server 210, and a database of ad requests 220. In other embodiments, social networking system 100 may include additional, fewer, or different modules for various applications.

Web server 140 links social networking system 100 via network 170 to one or more client devices 180, as well as to one or more third party websites 190. Web server 140 may include a mail server or other messaging functionality for receiving and routing messages between social networking system 100 and client devices 180 or third party websites 190. The messages can be instant messages, queued messages (e.g., email), text and SMS messages, or any other suitable messaging technique.

Action logger 160 is capable of receiving communications from the web server 140 about member actions on or off social networking system 100. Newsfeed generator 150 generates communications for each member about information that may be relevant to the member. These communications may take the form of stories, each story is an information message comprising one or a few lines of information about an action in the action log that is relevant to the particular member. The stories are presented to a member via one or more pages of the social networking system 100, for example in each member's home page or newsfeed page.

Ad server 210 performs an ad selection algorithm. Ad server 210 is communicatively coupled to the database of ad requests 220 and to action log 230 for this purpose.

Figure 2:
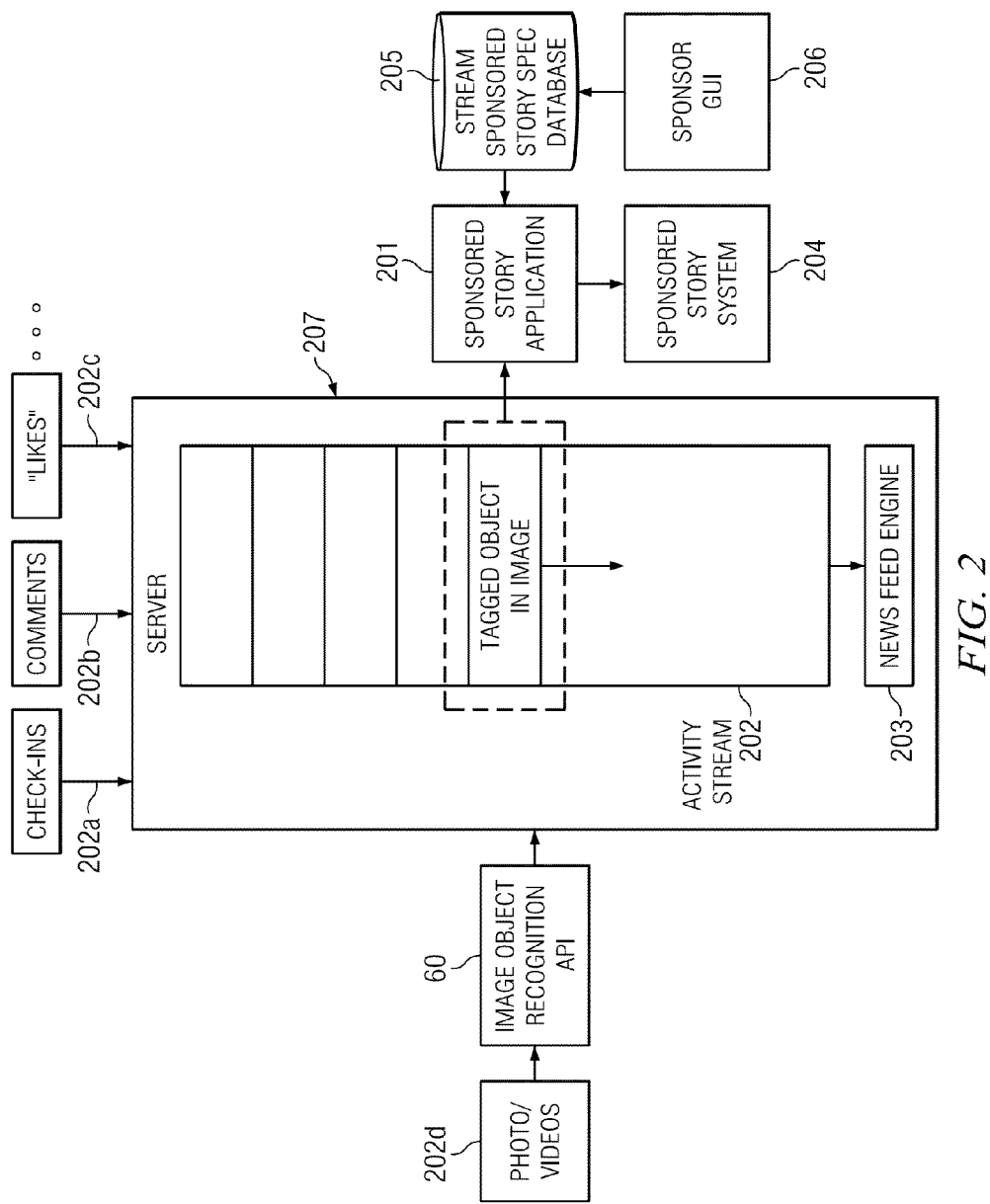
FIG. 2 depicts the interaction between the organic activity stream and the sponsored story specification database to create sponsored stories from newsfeed stories in accordance with one embodiment of the disclosure.

FIG. 2 shows the interaction between sponsored story application 201 and an activity stream 202. In particular embodiments, sponsored story application 201 may be software residing within the sponsored story system 204, or part of the stream sponsored story database 205. In particular embodiments, sponsored story application 201 may be software executed by any number of servers in the social networking system, either in conjunction or in isolation. In particular embodiments, sponsored story application 201 may reside on its own dedicated hardware.

Activity stream 202 comprises the aggregate stream of status updates and news stories for all users of a social network. In particular embodiments, activity stream 202 may include all types of user activity, such as check-ins 202a, comments 202b, "likes" 202c, etc. In particular embodiments, activity stream 202 includes photo and video uploads 202d. In particular embodiments, photos and videos uploaded to social networking system 100 are first passed to image object recognition API 60. Image object recognition API 60 detects objects within uploaded images such as products, logos, text, etc. in accordance with the process described in FIG. 5. Upon detecting such objects, image objection recognition API 60 tags the uploaded images. In particular embodiments, the tags may be represented as edges connecting particular concept nodes in the social graph. In particular embodiments, the object tags are metadata appended to the photo file. This disclosure contemplates any manner of associating a particular image object in a photo or video to a particular concept node.

Activity stream 202 under normal operation passes to news feed engine 203 (communicatively linked to news feed generator 150 in FIG. 1), which parses the individual stories in activity stream 202 and determines which users' (generally the friends of the user who generated the story) pages to display each story on. In particular embodiments, both activity stream 202 and newsfeed engine 203 are applications residing in server 207. In particular embodiments, activity stream 202 or newsfeed engine 203 are applications distributed across one or more computing servers. This disclosure contemplates any suitable implementation of activity stream 202 and newsfeed engine 203.

Figure 7A:
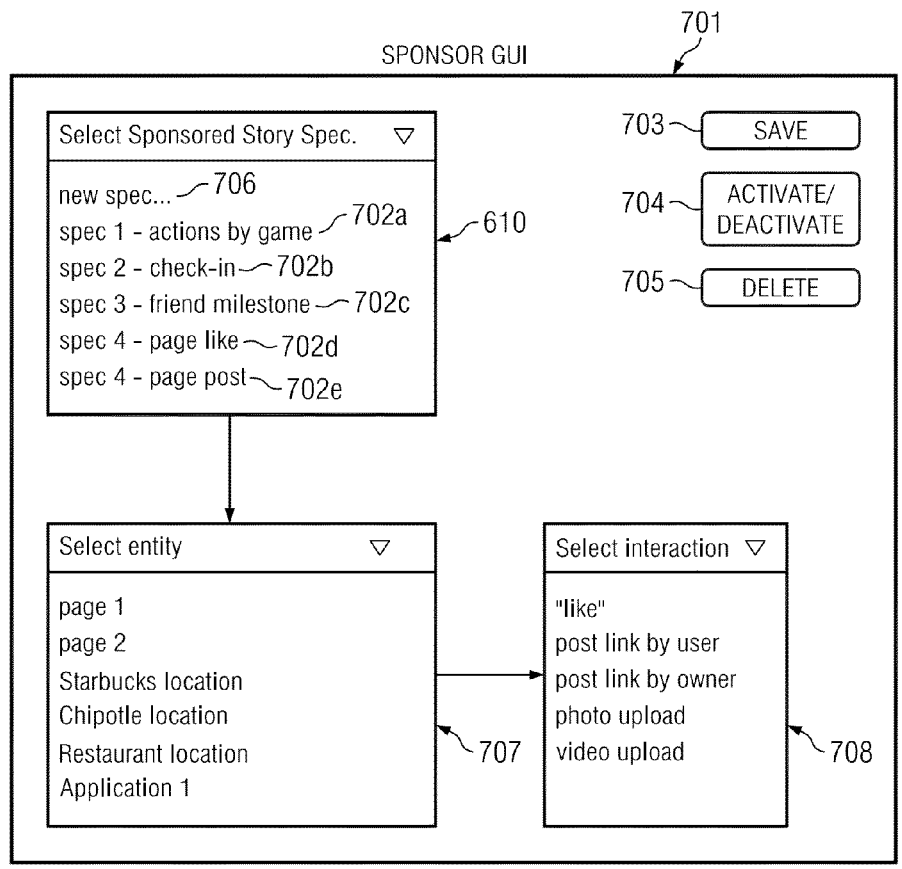
FIG. 7A is an example of the sponsor GUI used by sponsors to specify the type of stories they wish to sponsor or promote to the sponsored story system, in accordance with an embodiment of the invention.
Figure 7B:
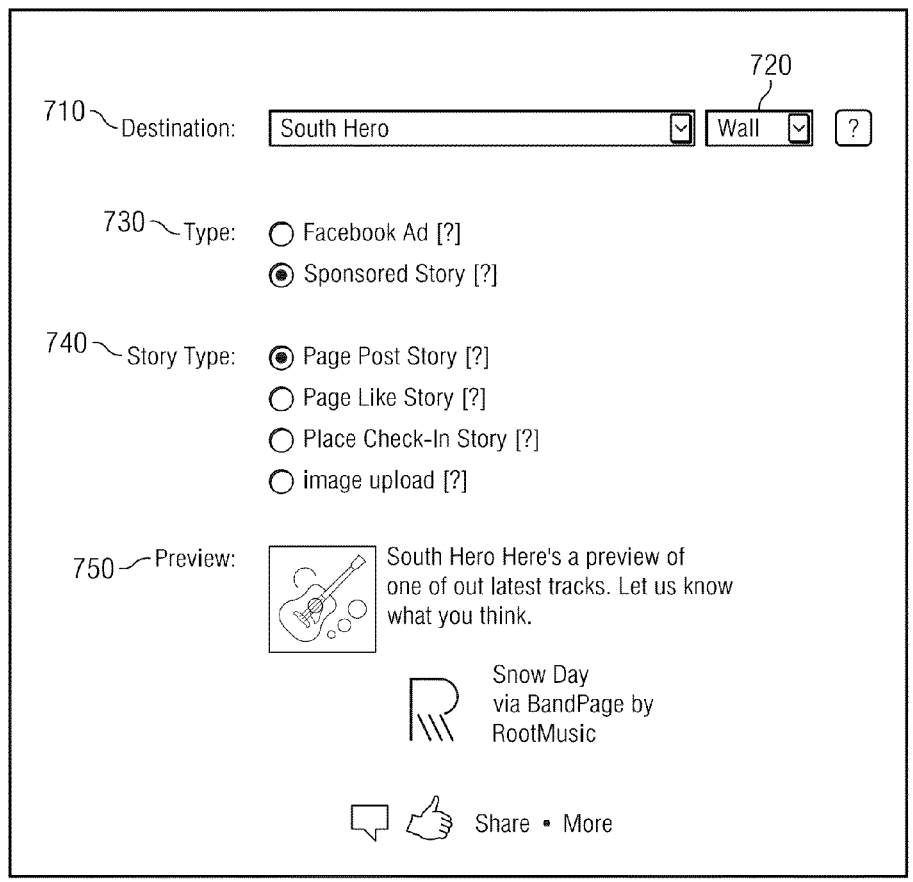
FIG. 7B is an example of a simplified sponsor GUI.

A sponsor uses Sponsor GUI 206 to specify the type of stories it wants promoted to the sponsored story section of users' pages. Examples of Sponsor GUI 206 are depicted in FIGS. 7A and 7B. The Sponsor GUI 206 provides a method for the sponsor to create story filters to locate specific types of news feed stories for promoting to the sponsored story space of a user's home page. Once the sponsor sets up its preferences for the types of stories it wishes to promote to the sponsored story portion, the sponsor specifications are stored into stream sponsored story specification database 205. In particular embodiments, sponsor GUI 206 allows sponsors to continually scan activity stream 202 for photo uploads that have tags associated with the concept node or entity specified by the sponsor.

Figure 3:
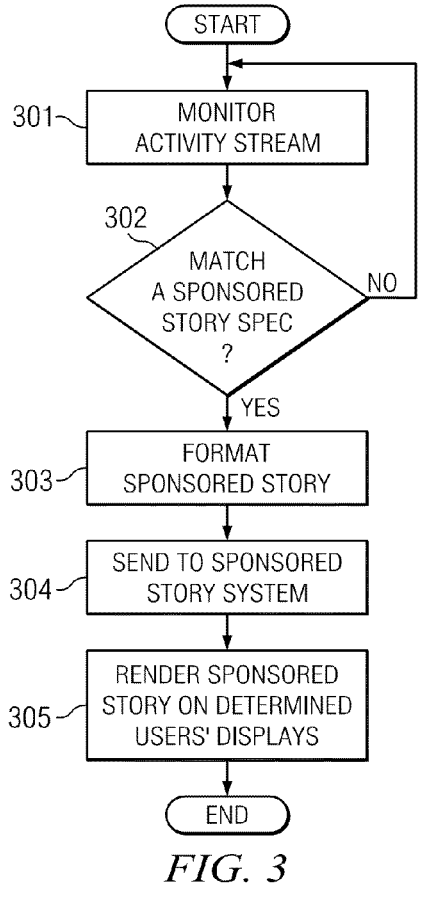
FIG. 3 illustrates a method for promoting sponsored stories to a sponsored story space.

FIG. 3 depicts the overall flow of the sponsored story system 204 and method. In step 301, sponsored story application 201 constantly monitors activity stream 202, searching for matches to any of the sponsored story specifications in stream sponsored story specification database 205. In particular embodiments, where the sponsor has set-up a specification for uploaded images tagged with particular objects, the sponsored story application 201 monitors all user uploaded images.

In step 302, the sponsored story system compares each story in activity stream 202 to all stream sponsored story specifications in stream sponsored story specification database. In particular embodiments, sponsored story system compares the metadata or tagged objects in each user uploaded photo in activity stream 202 to all the stream sponsored story specifications. If there is a match, the procedure continues to step 303, if not, it loops back to 301.

In step 303, upon finding a match, sponsored story application 201 pulls the matching entry out of activity stream 202, and formats the entry into a predetermined visual specification. In particular embodiments, the visual specification is dictated by the social networking system to mimic a regular news feed story. In other embodiments, special identifiers may be added by the social networking system to indicate that the story is a sponsored story. In other embodiments, the visual specifications are entered by the sponsor through the Sponsor GUI 206 at the time of stream story specification. In such an embodiment, the visual specification is stored along with the story specification in the stream sponsored story specification database 205. In particular embodiments, the sponsor is given limited discretion as to the visual specifications for the promoted stream story, subject to predetermined constraints imposed by the social networking system.

Where the sponsored story specification requires the upload of a photo or video tagged with a particular object, upon finding such a matching photo or video, sponsored story application 201 formats the matching photo or video into a sponsored story including the photo or video. In particular embodiments, the photo or video is cropped or reduced in resolution. In particular embodiments, it is cropped to include the tagged object and, if possible, a person's face in the photo or video. In particular embodiments, the sponsored story is clickable, and clicking the story launches a full-size photo or video viewer. In particular embodiments, tag lines or promotional text specified by the sponsor in sponsor GUI 206.

In step 304, after the story is formatted pursuant to the visual specification or by the social networking system to visually comport with a news feed story, the sponsored story is passed to sponsored story system 204.

In step 305, after an entry from activity stream 202 is formatted into a sponsored story, it is priced and directed toward users in a similar manner as a social ad. In particular embodiments, the sponsor may also add a weight to the story to alter its direction toward users. For example, certain stories may decay quickly, such as check-ins, and are not displayed to other users beyond a predetermined threshold time period from the story generation. In other embodiments, sponsor-specified temporal factors, such as deadlines, may increase the weight of the sponsored story so that it is promoted over other sponsored stories lacking time sensitivity.

Specifically with regard to photo and video stories having tagged objects, the sponsor may access social targeting functions through analysis of the social graph. For example, the ad system may display the sponsored story to friends of the uploading user. In particular embodiments, the sponsored story may be more heavily weighted toward display to the friends of the user who express an affinity for the tagged object or competitors of the tagged object. In particular embodiments, the sponsored story is displayed more frequently to friends of the uploading user in a particular age range, demographic group, or geographic location. In particular embodiments, the sponsored story may be targeted toward users who have a higher relative affinity with the uploading user, or with other users tagged in the photo. In particular embodiments, the relative affinity is a coefficient score between any two users. The coefficient score may take into account the degree of interaction between the two users, their similarity, their geographic proximity, their age, their common friends, and their common affinities. This disclosure contemplates any suitable manner or combination of methods of targeting specific users for the display of sponsored stories.

In particular embodiments, ad targeting is based upon an affinity score calculated by social networking system 100. A member may have affinities for other members, types of actions, types of objects, and content. Accordingly, a calculated affinity score may be based on a weighted function that takes into account the set of affinities for the particular member for each type of data field that is in a candidate story. The website may obtain a member's affinities based on the member's express interests (whether provided directly or indirectly, for example, through communications with other members) or impliedly based on the member's actions (e.g., a member's checking of another member's page indicates an interest in that other member, or clicking on particular types of links may indicate an interest in similar links). An affinity, as measured for example by an affinity score, need not be an actual subjective interest or lack of interest that a member has for something (i.e., the member likes punk rock music, and dislikes vegetarian restaurants), but rather it may merely be a correlation between something in the candidate story and some information stored in connection with that member, whether is an action taken by the member, a communication involving the member, a characteristic, feature or expressed interest in the member's profile.

Figure 4:
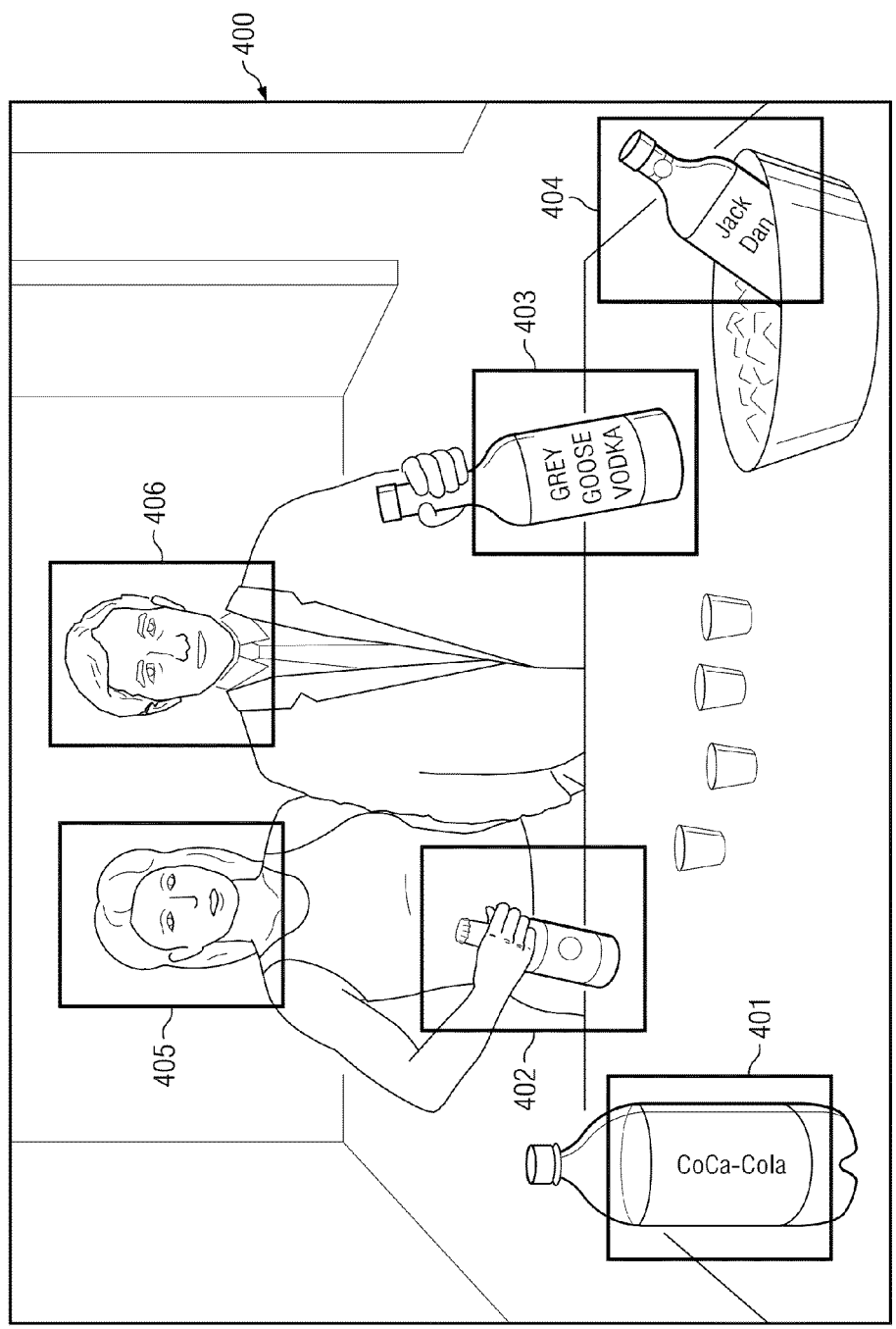
FIG. 4 depicts an example user-uploaded photograph and the detected objects contained therein.

FIG. 4 illustrates an example user-uploaded image 400. Image 400 includes, for didactic purposes, faces 405 and 406, and various objects 401-404 that may be recognized by image object recognition API 60 upon reception by social networking system 100. Image object 401, in this case, a bottle of "Coca-Cola", may be detected through optical character recognition or other computer vision techniques. Similarly image object recognition API 60 may detect the beverage 402 through comparison of the logo with a number of saved logos in photographic object database 130. Although the example image 400 includes 4 types of product labels this disclosure contemplates detecting any type of image object, such as signage in the background of photos, cars, famous buildings, and the like. For example, object image recognition algorithm may recognize the make and model of a vehicle in a picture of a person sitting in his or her new car, and tag the image accordingly. Similarly, image object recognition API 60 may detect signage at corporate-sponsored events. This disclosure contemplates any type of object recognition.

Figure 5:
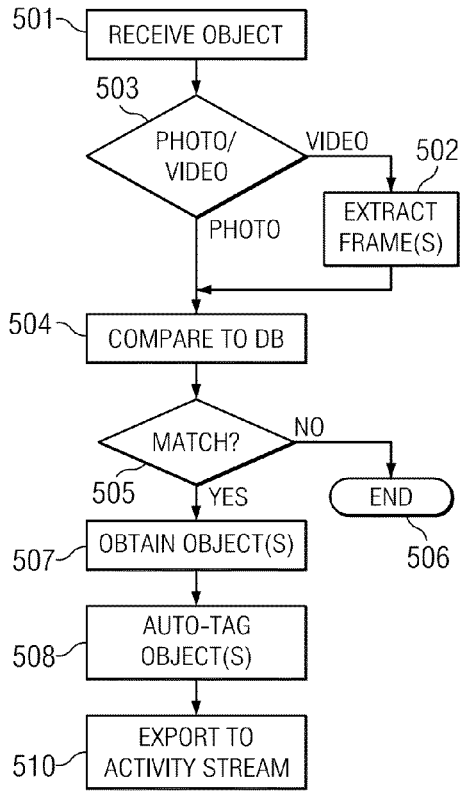
FIG. 5 is a flowchart of an example method of detecting objects within an uploaded multimedia object according to one embodiment.

FIG. 5 illustrates an example method of detecting image objects in a multimedia object. At Step 501, one or more servers of social networking system 100 running image object recognition API 60 receives a multimedia object. The multimedia object may be uploaded from client device 180 through any type of packet data connection. In particular embodiments, the multimedia object is uploaded substantially in real-time automatically through the wireless data connection of client device 180. In particular embodiments, the multimedia object is uploaded in response to user inputs to client device 180. In particular embodiments, the multimedia object is uploaded in connection with a check-in. Regardless of when or how the multimedia object is uploaded, the method proceeds to step 502, where image object recognition API 60 determines whether the uploaded multimedia object is a photo or video.

If image object recognition API 60 determines that the uploaded multimedia object is a video, the method proceeds to Step 502. In Step 502, image object recognition API 60 extracts one or more individual frames from the video file. Image object recognition API 60 may extract frames from a video file in any manner. For example, in particular embodiments, image object recognition API 60 may select the first frame. In particular embodiments, location API may select the frame or frames which have the greatest similarity to other frames. In particular embodiments, image object recognition API 60 may select frames at predetermined intervals. In particular embodiments, image object recognition API 60 may generate composites of multiple frames. This disclosure contemplates any manner of selecting and extracting frames from a video file.

After extracting one or more frames for comparison from the video file, or if the multimedia object is a single photographic image, the method proceeds to Step 504. At Step 504, image object recognition API 60 compares the uploaded photo or extracted frames to photographs in photographic object database 130. In particular embodiments, this process is carried out through specialized a object recognition application. In particular embodiments, this step is carried out by image object recognition API 60. In particular embodiments, one or more software modules for comparing textures, edges, smooth objects, and the like carry out Step 504. In particular embodiments, image object recognition API 60 performs frequency-domain image processing or texture recognition to match a particular object in the uploaded photo to an object in one of the photographs in photographic object database 130. In particular embodiments, image object recognition API 60 uses graph similarity functions to perform the image matching. In particular embodiments, image object recognition API 60 creates object representations based on two-dimensional shape primitives for each object in the uploaded photo, and compares the primitives to primitives stored in association with each photo in photographic object database 130. In particular embodiments, image object recognition API 60 creates a transformed image from the uploaded photo using wavelet transforms, and compares the image to wavelet transforms of images stored in photographic object database 130. In particular embodiments, image object recognition API 60 utilizes a neural network to classify objects in the uploaded image. Methods of image matching and image object recognition are well-known in the art, and this disclosure contemplates any suitable method for matching objects in the uploaded image with objects contained in the images stored in photographic object database 130.

Comparison Step 504 may include extracting text from the uploaded image or extracted frames. Image object recognition API 60 may include an optical character recognition application or other software modules that, alone or in conjunction, may locate blocks of text, perform OCR on the blocks of text, and extract searchable text from the OCR process. For example, the text on bottle 403 ("Grey Goose Vodka") may be searched and matched with a database of concept nodes or photographs with extracted text in photographic object database 130. Because of the relative speed at which text may be searched versus images, in particular embodiments, image object recognition API 60 first narrows the set of images in photographic location database 130 to be compared with the uploaded image to only those stored with extracted text matching a portion of the text extracted from the uploaded image.

If image object recognition API 60 completes the search of all images in photographic location database 130 without a match, the process terminates at Step 506. In particular embodiments, image object recognition API 60 may progressively increase the search set until a match is found or every single image in photographic location database 130 is searched. If an object in the uploaded image or extracted frames matches an object contained in an image stored in photographic object database 130, at Step 507, image object recognition API 60 obtains the concept node identifier stored in association with the matching image.

Upon obtaining the concept node identifiers associated with one or more photographs in photographic object database 130 containing objects matching objects in the uploaded photo, image object recognition API 60 tags the detected object in Step 508. Thus, in the example of FIG. 4, coca-cola bottle 401 would be tagged with the concept node for "Coca-Cola," vodka bottle 403 would be tagged with the concept node "Grey Goose", bottle 404 would be tagged with "Jack Daniel's", and so on. In particular embodiments, a single object may be tagged with multiple concept nodes. For example, bottle 404 may be tagged with "Jack Daniel's" as well as "Old No. 7", or "Gentleman Jack." Once the images have been associated with various concept nodes, the photo is exported in Step 510 to the activity stream in the form of a photo-upload story or entry.

As a result of the method of FIG. 5 performed on every photo or video uploaded to the social networking system, the social networking system has access to and stores a vast amount of product data for its set of geographically diverse users. For example, because the social networking system is aware of where the photo or video was taken, or at a very minimum, the physical location associated with the user who uploaded the photo or video, the social networking system may build a database of geographic locations where any given product was captured. This geographic database may be queried by product owners to determine the penetration of their products to specific geographic areas in order to test the effectiveness of their advertisements. For example, Grey Goose vodka may wish to assess the effectiveness of an advertisement campaign or ad agency that they have employed in the San Francisco bay area. By querying a "product heat map" that displays where their product has been detected over time, Grey Goose may determine whether the advertising campaign has been effective by comparing the number of detected instances of their product in the photos associated with the SF bay area at intervals before and after the ad campaign.

In particular embodiments, the social networking system may charge product owners for these analytics, as a package, or on a per-query basis. In particular embodiments, the social networking system may track other demographic information about the users uploading photos and videos in which products are detected. For example, Grey Goose may wish to determine the popularity of its vodka among females aged 27-35 living in urban areas. The social networking system may provide a "heat map" with adjustable filters so product owners may finely tune their query demographics. This disclosure contemplates any suitable method of building a geographic product database and any suitable commercial application.

Figure 6:
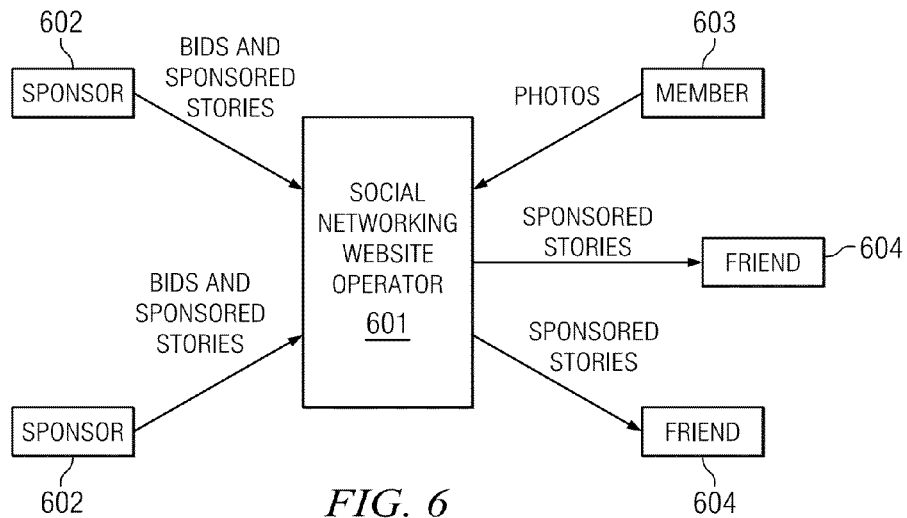
FIG. 6 depicts example components in an sponsored story system in a social network.

FIG. 6 illustrates an event diagram for a sponsored story model in accordance with one embodiment of the invention. In this sponsored story model, a number of sponsors 602 bid for the placement of sponsored stories on a social networking system 100. A social networking system operator 601 receives these bids, for example, through a web interface accessible to sponsors 602. Accompanying each bid is a description of the sponsored story that sponsor 602 would like to publish to for display to a particular set of members of the social network. This disclosure contemplates a variety of methods of publishing the sponsored story. In particular embodiments, the sponsored story is published on a social network member's home page on the social network. In particular embodiments, the sponsored story may be displayed on a predetermined area of a mobile device. In particular embodiments, the sponsored story may be published through notifications in the social network. In particular embodiments, the sponsored story may be published through e-mail, instant messaging, or other messaging applications. In particular embodiments, the sponsored story may be displayed on a third-party website integrated with the social network. The web interface may thus allow sponsor 602 to specify all of the relevant information for a sponsored story request, including the bid amount for the sponsored story.

The bid amount specified in the sponsored story request may indicate an amount of money that sponsor 602 will pay for each time a member presented with the sponsored story clicks on it. In one embodiment, the sponsor may be a non-profit or charity where the bid amount is given at little or no cost. Alternatively, the bid amount may specify an amount that sponsor 602 will pay the website operator 601 each time the sponsored story is displayed to a member or a certain number of members or each time the sponsored story is clicked on by a member or a certain number of members. In another embodiment, the sponsor may pay a set amount per month or period of time and the social networking system will determine the bid amount or how and when to display the sponsored stories. In addition, the sponsored story request may allow sponsor 602 to specify targeting criteria. This targeting criteria may be a filter to apply to fields of a member's member profile or other object, or it may include free form text such as wall posts, comments, and messages. In one embodiment, in order to optimize the targeting and selection of sponsored stories for users of a social network, social information gathered on and off the social network about a user is leveraged to infer interests about users of the social network. A social network may maintain a social graph that identifies the mapping of connections among the users, including entities such as businesses, applications, groups, etc, of a social network, and the social network may also maintain profiles that contain full or partial information about each of the users in the social network. Targeting may be based one or more factors such as member demographics (age, gender, location, education level, employers, employment type, work history and experience, hobbies, and or preferences). These factors may draw from explicit member statements such as listing it on their profile, connections to other members or entities, or through user-entered text on and off the social networking site. In another embodiment, these factors may be implicitly or inferred by the social network.

One or more sponsored stories available to the social network may contain targeting criteria for determining whether the sponsored story should be targeted to a particular user. While the social network may have sufficient information about some of its users to apply the targeting criteria, the social network may not have sufficient information about other users to apply the targeting criteria. Rather than missing out on the opportunity to target sponsored stories to this latter group of users, embodiments use the information for other users to whom a particular user is connected when the social network does not have sufficient information to apply the targeting criteria to the user. This may be thought of as "inferential" targeting because a user's likely interest in a particular ad is inferred based on whether that user's connections (e.g., friends in the social network) are good candidates for the sponsored story based on its targeting criteria.

FIG. 7A depicts an example of sponsor GUI 701. Sponsor GUI includes a drop down window 710 that allows a user of the GUI 701 to select any previously saved stream sponsored story specification 702*a*-702*e*. User controls 703, 704, and 705 give the user the option to save, deactivate/activate, or delete an existing stream sponsored story specification. User control 706 provides the user with the option to create a new stream sponsored story specification. The process of creating a new stream sponsored story specification is described in detail below.

Upon selecting user control 706, the user is presented with another set of drop down commands 707. Drop down menu 707 lists all the entities with which a user is associated in the social network. Examples of such an entity include but are not limited to, pages that the user has created to interact with fans of the page, such as for a musician or TV show, applications associated with the user, such as social networking games, deals or coupons associated with the user, and physical locations associated with the user that members of the social network may "check in" to, in order to indicate that they or others were physically at the location.

After the user has selected the entity associated with the user to be included in the stream sponsored story specification, the user selects, using drop down menu 708, the types of interactions members of the social network have with the entity on and off the social network that the user would like to promote to the sponsored story space. User interactions include, but are not limited to tagging, sharing, "liking", commenting on media or mentioning a user in a status update or comment, fringing someone, RSVPing or inviting a user to an event or game, and the like. Other user interactions include but are not limited to "check-ins" and other location-based social interactions, sharing a link from a third-party website, "liking" a post or page from a third-party site, buying, redeeming, or subscribing to deals and other promotions, and interacting with an application on or off the social network. In particular embodiments, the sponsor or user may select "photo upload" or "video upload" as interactions with a concept node. As described above, any user-uploaded multimedia object that contains objects detected by image object recognition containing concept nodes as specified by the user or sponsor may be boosted as a sponsored story. Any time a user makes a connection or performs a social action on the social network, a new story is generated in activity stream 202 that may ultimately be promoted.

In particular embodiments, where a user utilizing sponsor GUI 206 selects "photo upload" or "video upload" sponsor GUI 206 may prompt the user to upload images to aid in the detection of a product or logo. In such embodiments, the user may upload photos of products from various orientations and lighting, or vector graphics files of the logo to be searched to photographic object database 130. In particular embodiments, the sponsor may upload a 3D model and texture of the specific product to be searched for, and sponsored story application 201 dynamically generates the image to be matched. This disclosure contemplates any method of building photographic object database 130.

Depending on the type of entity selected in drop down menu 707, the interactions available in menu 708 available to the user vary. For example, if the user selects a page, such as for a band or musician, from menu 707, the interactions in 708 may include: when a member "likes" the page, when a member posts a link on page, when the page owner (generally, but not necessarily, the user of the sponsor GUI itself) posts a link on the page, or when a member shares a link to an external website that is related to the page. As another example, if the user of the sponsor GUI selects a place, such as a store location, from drop down menu 707, the GUI may show, in drop down menu 708: when a member of the social network "checks in" to the place, when a member of the social network gives a review of the place greater than a predetermined threshold, or when a member of the social network "likes" the place.

As described above, actions by users performed off of a social networking system (e.g., actions on third party websites or in the real world) may be used to generate sponsored stories on the social networking system. Conversely, in various embodiments of the invention, a social networking system can collect its users' actions and then present sponsored stories or other information concerning actions taken by its users on third party websites. In this way, the techniques for promoting actions using this information can be extended beyond a social networking system itself.

FIG. 7B depicts a simplified sponsor GUI 206. The sponsor may use controls 710 and 720 to select where to display the sponsored story. For example, in 720, the user may select to display the sponsored story on targeted members' walls. Using controls 740, the sponsor may select what kind of story sponsored story App 201 should search for in activity stream 202. In this example, the sponsor may select from a page post story, page "like" story, a place check-in story, or an uploaded multimedia object as described above. Finally, the sponsor GUI 206 may provide a preview 750 of the sponsored story.

Figure 8:
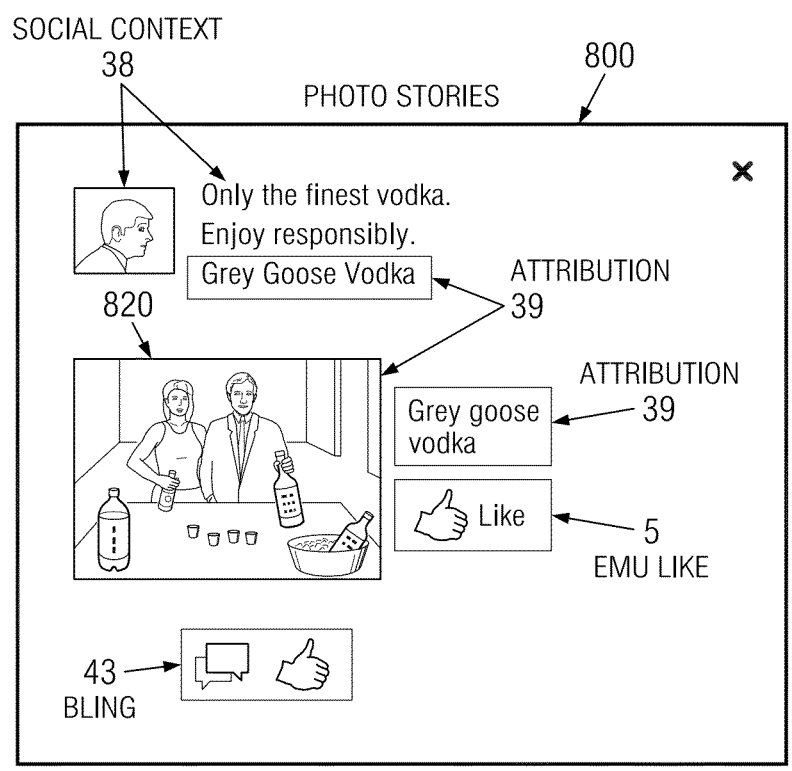
FIG. 8 illustrates the photograph of FIG. 4 as a sponsored story in accordance with one embodiment of the invention.

FIG. 8 illustrates an example of a user uploaded photo promoted to a sponsored story by sponsored story application 201. Photo and video stories promoted to a sponsored story space include a reduced size image 820. Reduced size image 820 may be the uploaded image, for example, image 400 of FIG. 4, scaled down in resolution or cropped. In particular embodiments, reduced size image 820 is a cropped version of the image 400 from which it was generated, but the cropping is guaranteed to include the image area of the object associated with the sponsor concept node. For example, in particular embodiments, if image 400 were boosted to a sponsored story by Grey Goose, image 400 would be cropped as tightly as possible to include both faces 405, 406, as well as Grey Goose bottle 403.

Sponsored story 800 includes a social context 38. In particular embodiments, social context 38 comprises the user who uploaded the photo or video, and a comment entered by the uploading user. In particular embodiments, social context 38 includes the caption of the photo or video. In particular embodiments, such as FIG. 8, social context 38 is a message from the sponsor itself. For example, a picture of two individuals holding multiple products, as in FIG. 4, does not help to promote the sponsor, particularly if the products are from differing companies. Thus, the sponsor may wish to include taglines to identify what product is being advertised, such as "Grey Goose. Only the finest vodka" as depicted in FIG. 8. In particular embodiments, sponsored story 800 may also include an attribution 39, corresponding to the entity selected by the sponsor in sponsor GUI 306. In particular embodiments, the attribution is the concept node associated with the detected objects in the uploaded photo or video. For example, in FIG. 4, image object recognition API 60 detected concept nodes for "Cola-Cola", "Jack Daniels" and "Grey Goose", and tagged or otherwise associated photo 400 with these concept nodes.

Sponsored story 800 may also include a bling indicator 43, which provides a visual indication as to how many members of the social networking site have commented or liked the sponsored story. Emu like interface 5 allows users to quickly interact with the node/entity by "liking" it. In particular embodiments, sponsored story 800 may include an action link which allows a user, when selecting the link, to quickly perform a predetermined action, such as viewing a large-resolution version of photo 820. In particular embodiments, the action link may be reduced size image 820. In particular embodiments, action link may be an external button that takes the user to the concept node hub page or an external site.

Figure 9:
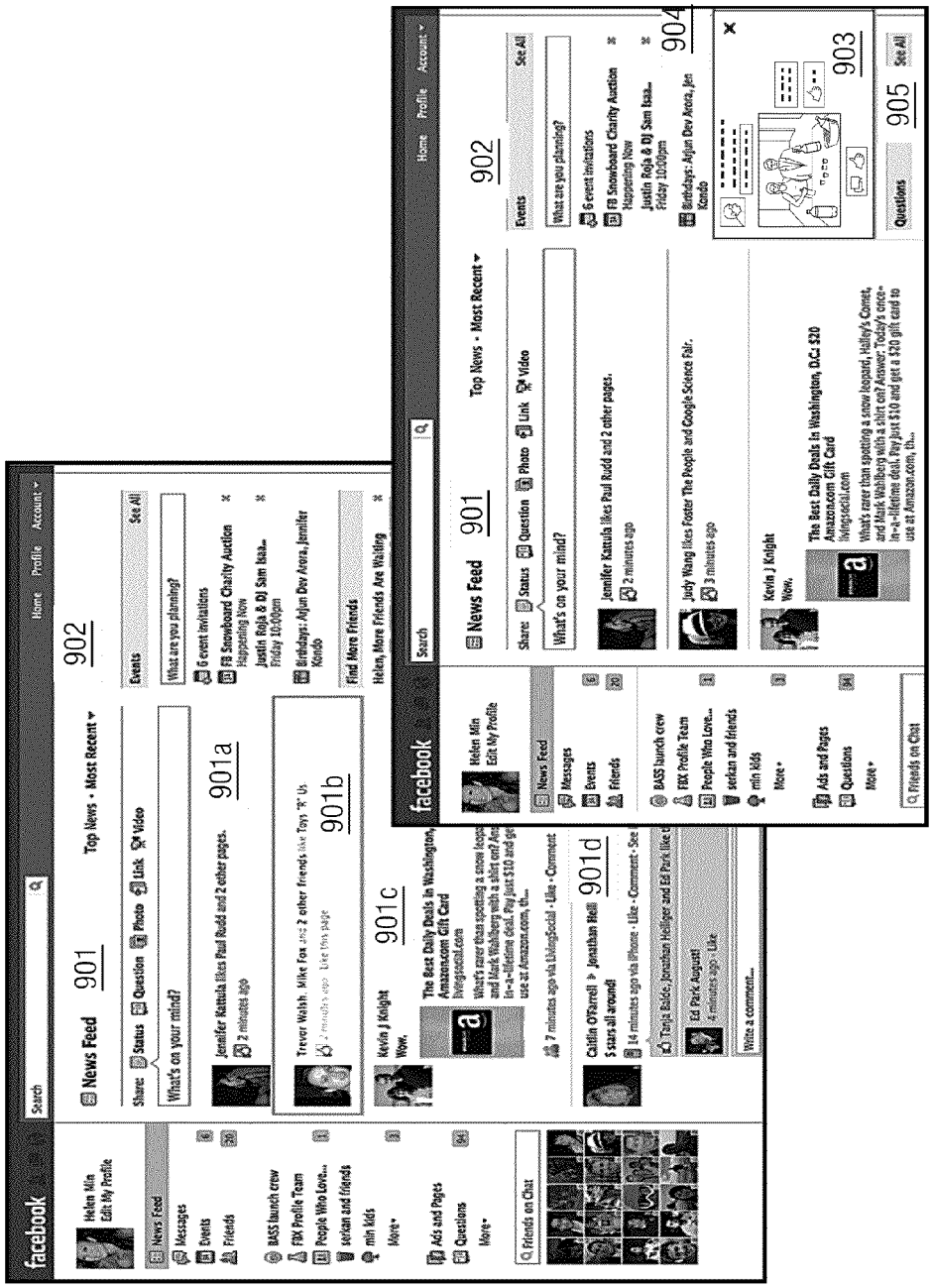
FIG. 9 is an example of a news feed photo upload story promoted to the sponsored story space of a user's social networking homepage in accordance with one embodiment of the disclosure.

In FIG. 9, a user's newsfeed 901, recommendation space 902, sponsored story space 903, notifications 904, and questions 907 are depicted. In particular embodiments, elements 901-905 are displayed on a social networking user's home screen. In particular embodiments, element 901 is displayed on a user's home screen, and one or more of elements 902-905 are displayed at all times. This disclosure contemplates any arrangement of elements 901-905 and any degree of persistence. In particular embodiments, elements 902-905 are displayed on other user's pages. In particular embodiments, these other users may be the user's friend. In other embodiments, these other users may be otherwise associated with the user. In particular embodiments, the display of elements to other users 902-905 is determined by sponsored story system 204.

Sponsored story system 204 accesses a database of user privacy preferences when determining which users to display the sponsored story to. For example, if a user has previously specified that he or she does not wish to see sponsored stories from a particular company, the sponsored story system will not display stories promoted by that particular company. In particular embodiments, sponsored story system 204 accesses the visibility and privacy settings of the user that generated the newsfeed story to be promoted, and uses the settings in determining which users to display the promoted story to. For example, a user may have multiple friend lists, and members belonging to one or more different lists may be prevented from viewing specific stories, types of stories, or the user's newsfeed altogether. As another example, users may specify who may view their photos. If a photo is promoted to a sponsored story, only the users who have permission to access the photo itself may see the sponsored story generated from the photo. Sponsored story system 204 respects these settings so that only friends of the user who are granted access to view the newsfeed story to be promoted are displayed the promoted stream sponsored story.

This disclosure contemplates various methods of determining which users to display element 903 to as envisioned by those of ordinary skill in the art. Newsfeed 901 includes newsfeed stories 901a-901d. These stories are generated specifically for a user based upon the activities the user's friends or other entities the user is associated with. Newsfeed story 901b is an example of a newsfeed story that has been selected for promoting to sponsor space 903. When the sponsored story application 201 detects a match in the activity stream 202 to an sponsor's stream sponsored story specification from the stream sponsored story specification database 203, the sponsored story 903 is formatted to resemble a news feed story and sent to the sponsored story system 204. In this particular example, the stream story relates to a photo upload of photo 400, where two of the user's friends were included in a photo having "Grey Goose Vodka" in the photo.

Figure 10:
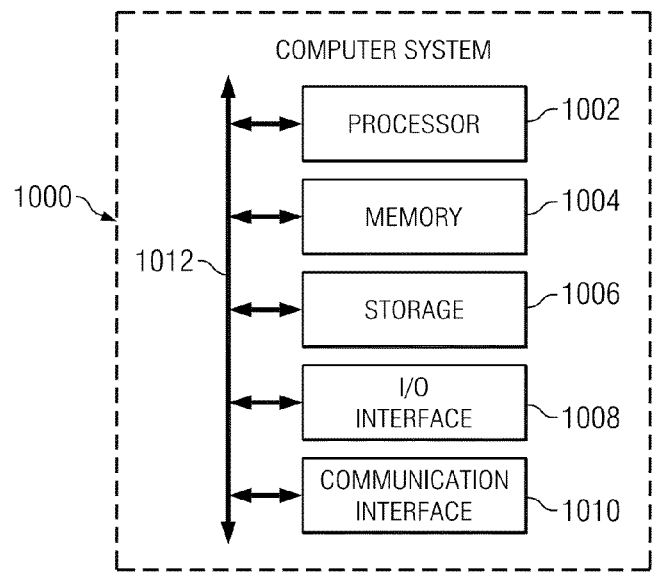
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple datacenters; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004.

Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 02 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 11:
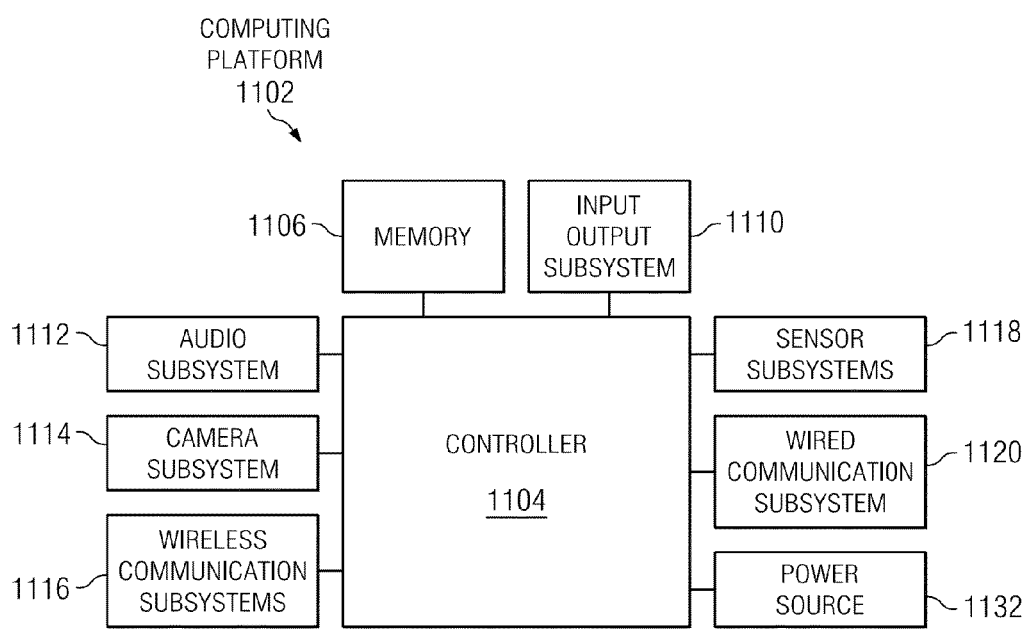
FIG. 11 illustrates an example mobile client device.

The client-side functionality described above can be implemented as a series of instructions stored on a computer-readable storage medium that, when executed, cause a programmable processor to implement the operations described above. While the client device 180 may be implemented in a variety of different hardware and computing systems, FIG. 11 shows a schematic representation of the main components of an example computing platform 1102, according to various particular embodiments. Multipoint sensing devices generally include a controller 1104 which may comprise a microcontroller or one or more processors configured to execute instructions and to carry out operations associated with a computing platform. In various embodiments, controller 1104 may be implemented as a single-chip, multiple chips or other electrical components including one or more integrated circuits and printed circuit boards. Controller 1104 may optionally contain a cache memory unit for temporary local storage of instructions, data, or computer addresses. By way of example, using instructions retrieved from memory, controller 1104 may control the reception and manipulation of input and output data between components of computing platform 1102.

Controller 1104 together with a suitable operating system may operate to execute instructions in the form of computer code and produce and use data. The operating system, other computer code (including control client 1107 described below) or data may be physically stored within a memory block 1106 that is operatively coupled to controller 1104. Memory block 1106 encompasses one or more storage media and generally provides a place to store computer code (e.g., software or firmware) and data that are used by the computing platform 1102. Memory block 1106 may also include one or more fixed storage devices in the form of, by way of example, solid-state hard disk drives (HDDs), among other suitable forms of memory coupled bi-directionally to controller 1104. Information may also reside on a removable storage medium loaded into or installed in multipoint sensing devices when needed.

Controller 1104 is also generally coupled to a variety of interfaces such as graphics control, video interface, input interface, output interface, and storage interface, and network interface, and these interfaces in turn are coupled to the appropriate devices. In certain embodiment, Controller 1104 may connected to an input structure 1114 and display 1116 may be provided together, such an in the case of a touchscreen where a touch sensitive mechanism is provided in conjunction with the display 1116. In such embodiments, the user may select or interact with displayed interface elements via the touch sensitive mechanism. In this way, the displayed interface may provide interactive functionality, allowing a user to navigate the displayed interface by touching the display 1116.

Electric signals (e.g., analog) may be produced by microphone 1110 and fed to earpiece 1112. Controller 1104 may receive instruction signals from input structure 1114 and control the operation of display 1116. By way of example, display 1116 may incorporate liquid crystal display (LCD), light emitting diode (LED), Interferometric modulator display (IMOD), or any other suitable display technology. Audio signals may be transmitted and received by means of an antenna 1117 that may be connected through a radio interface 1120 or audio input interface such as microphone 1124 to codec 1122 configured to process signals under control of controller 1104. Additionally, multipoint sensing devices may be powered power source 1132.

Computing platform 1102 may also include one or more user input devices 1134 (other than input structure 1114) that are operatively coupled to the controller 1104. Generally, input devices 1134 are configured to transfer data, commands and responses from the outside world into multipoint sensing devices. By way of example, mobile device may include a keyboard or mouse. Input devices 1134 may also include one or more hard buttons.

Display device 1116 is generally configured to display a graphical user interface (GUI) that provides an easy to use visual interface between a user of the computing platform 1102 and the operating system or application(s) running on the mobile device. Generally, the GUI presents programs, files and operational options with graphical images. During operation, the user may select and activate various graphical images displayed on the display 1116 in order to initiate functions and tasks associated therewith.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by one or more computer systems, sponsor specifications designating one or more concept nodes in a social network and a temporal factor to apply to sponsored stories;
monitoring, by one or more computer systems, an activity stream for upload by a user of the social network of one or more multimedia objects comprising one or more image objects associated with one or more of the concept nodes, respectively;
upon finding a matching multimedia object, by one or more computer systems:
determining, based at least in part on one or more privacy settings of the social network set by the user, one or more other users of the social network who are allowed to view the multimedia objects; and
exporting the matching multimedia object to a sponsored-story system;
calculating, for one or more sponsored stories, each sponsored story comprising at least part of one or more of the image objects corresponding to one or more of the exported multimedia objects, a score for the sponsored story based at least in part on a time the respective exported matching multimedia object was uploaded to the activity stream by the user and the temporal factor designated by the sponsor specifications; and
sending, to a client system of one or more of the other users for display, one or more of the sponsored stories based at least in part on the calculated scores.

2. The method of claim 1, wherein monitoring the activity stream comprises:
applying, by one or more computer systems, one or more image recognition algorithms to the multimedia objects uploaded by the user;
comparing, by one or more computer systems, at least a portion of the multimedia objects to a plurality of stored images in a database, each of the plurality of stored images associated with one or more of the concept nodes;

based at least in part on the comparison, by one or more computer systems, identifying one or more of the image objects as being associated with one or more of the concept nodes; and attaching, by one or more computer systems, meta-data identifying one or more of the associated concept nodes to the multimedia object.

3. The method of claim 2, wherein one or more of the multimedia objects comprises a video and one or more frames of the video are one or more of the image objects, and wherein comparing at least a portion of the multimedia objects comprises:

extracting, by one or more computer systems one or more of the frames from the video; and comparing, by one or more computer systems, one or more of the extracted frames to one or more of the stored images.

4. The method of claim 1, wherein the activity stream is a news feed of actions of one or more users of the social network.

5. The method of claim 2, wherein the sponsor specifications include a visual specification, and wherein the matching multimedia object is formatted into the one or more of the sponsored stories in accordance with the visual specification.

6. The method of claim 5, wherein the other users comprise all users of the social network connected to the uploading user.

7. The method of claim 5, wherein the other users comprise a portion of users of the social network connected to the uploading user.

8. The method of claim 7, wherein the portion of users is determined at least in part by an ad selection algorithm.

9. One or more non-transitory, computer-readable storage media embodying software that is operable when executed to:

receive sponsor specifications designating one or more concept nodes in a social network and a temporal factor to apply to sponsored stories;

monitor an activity stream for upload by a user of the social network of one or more multimedia objects comprising one or more image objects associated with one or more of the concept nodes, respectively;

upon finding a matching multimedia object:
determine, based at least in part on one or more privacy settings of the social network set by the user, one or more other users of the social network who are allowed to view the multimedia objects; and
export the matching multimedia object to a sponsored-story system;

calculate, for one or more sponsored stories, each sponsored story comprising at least part of one or more of the image objects corresponding to one or more of the exported multimedia objects, a score for the sponsored story based at least in part on a time the respective exported matching multimedia object was uploaded to the activity stream by the user and the temporal factor designated by the sponsor specifications; and send, to a client system of one or more of the other users for display, one or more of the sponsored stories based at least in part on the calculated scores.

10. The media of claim 9, wherein the software is further operable when monitoring the activity stream to:
apply one or more image recognition algorithms to the multimedia objects uploaded by the user;

compare at least a portion of the multimedia objects to a plurality of stored images in a database, each of the plurality of stored images associated with one or more of the concept nodes;

based at least in part on the comparison, identify one or more of the image objects of the multimedia object as being associated with one or more of the concept nodes; and attach meta-data identifying one or more of the associated concept nodes to the multimedia object.

11. The media of claim 10, wherein one or more of the multimedia objects comprises a video and one or more frames of the video are one or more of the image objects, and wherein the software is further operable when comparing at least a portion of the multimedia objects to:

extract one or more of the frames from the video; and
compare one or more of the extracted frames to one or more of the stored images.

12. The media of claim 9, wherein the activity stream is a news feed of actions of one or more users of the social network.

13. The media of claim 10, wherein the sponsor specifications include a visual specification, and wherein the matching multimedia object is formatted into the one or more of the sponsored stories in accordance with the visual specification.

14. The media of claim 13, wherein the other users comprise all users of the social network connected to the uploading user.

15. The media of claim 13, wherein the other users comprise a portion of users of the social network connected to the uploading user.

16. The media of claim 15, wherein the portion of users is determined at least in part by an ad selection algorithm.

17. A system comprising: one or more processors; and a memory coupled to the processors comprising instructions executable by the processors, the processors being operable when executing the instructions to:

receive sponsor specifications designating one or more concept nodes in a social network and a temporal factor to apply to sponsored stories;

monitor an activity stream for upload by a user of the social network of one or more multimedia objects comprising one or more image objects associated with one or more of the concept nodes, respectively;

upon finding a matching multimedia object:
determine, based at least in part on one or more privacy settings of the social network set by the user, one or more other users of the social network who are allowed to view the multimedia objects; and
export the matching multimedia object to a sponsored-story system;

calculate, for one or more sponsored stories, each sponsored story comprising at least part of one or more of the image objects corresponding to one or more of the exported multimedia objects, a score for the sponsored story based at least in part on a time the respective exported matching multimedia object was uploaded to the activity stream by the user and the temporal factor designated by the sponsor specifications; and send, to a client system of one or more of the other users for display, one or more of the sponsored stories based at least in part on the calculated scores.

18. The system of claim 17, wherein the processors are further operable when monitoring the activity stream to:
apply one or more image recognition algorithms to the multimedia objects uploaded by the user;

compare at least a portion of the multimedia objects to a plurality of stored images in a database, each of the plurality of stored images associated with one or more of the concept node nodes;

based at least in part on the comparison, identify one or more of the image objects of the multimedia object as being associated with one or more of the concept nodes; and attach meta-data identifying one or more of the associated concept nodes to the multimedia object.

19. The system of claim 17, wherein the activity stream is a news feed of actions of one or more users of the social network.

20. The system of claim 17, wherein the sponsor specifications include a visual specification, and
wherein the matching multimedia object is formatted into one or more of the sponsored stories in accordance with the visual specification.

* * * * *